G. DENO.
STOCK GRIPPING AND MARKING DEVICE.
APPLICATION FILED MAY 29, 1908.
916,681. Patented Mar. 30, 1909.
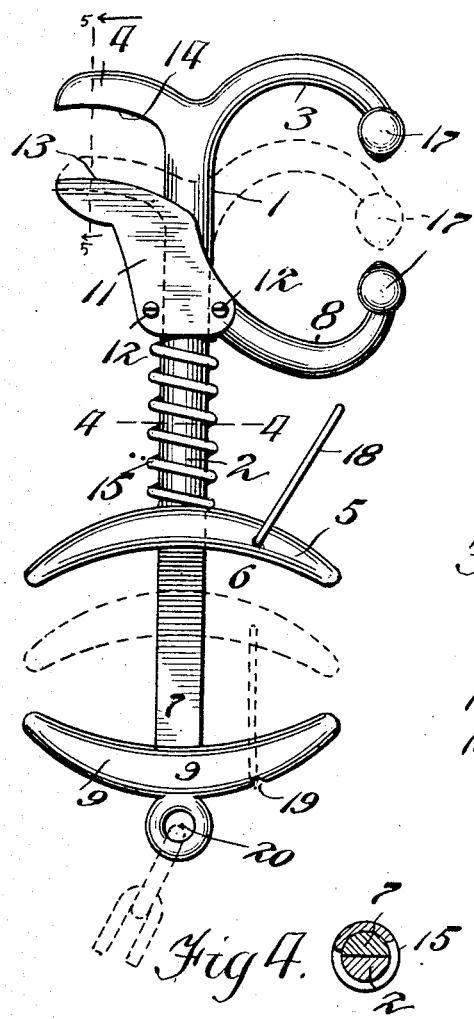
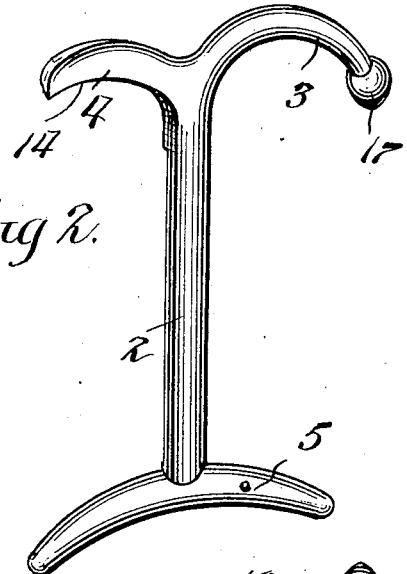
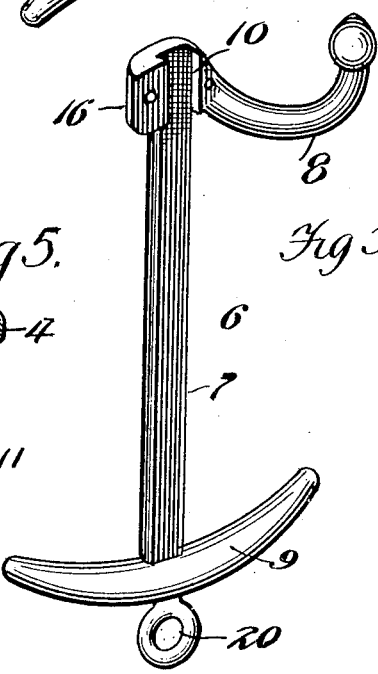
Inventor
George Deno
By Victor J. Evans
Attorney
Witnesses
Hugh H. Ott
J. W. Garner

UNITED STATES PATENT OFFICE.

GEORGE DENO, OF ELMONT, KANSAS.

STOCK GRIPPING AND MARKING DEVICE.

No. 916,681. Specification of Letters Patent. Patented March 30, 1909.

Application filed May 29, 1908. Serial No. 435,653.

*To all whom it may concern:*

Be it known that I, GEORGE DENO, a citizen of the United States, residing at Elmont, in the county of Shawnee and State of Kansas, have invented new and useful Improvements in Stock Gripping and Marking Devices, of which the following is a specification.

This invention is an improved stock gripping and marking device adapted for use in controlling and fastening unruly animals and also for use in cutting the ears of animals to mark the same, and the said invention consists in the construction, combination and arrangement of devices hereinafter described and claimed.

In the accompanying drawings:—Figure 1 is an elevation of a stock gripping and marking device constructed in accordance with this invention. Fig. 2 is a detail perspective of one of the members. Fig. 3 is a similar view of the other member. Fig. 4 is a detail transverse section taken on the plane indicated by the line 4—4 of Fig. 1. Fig. 5 is a detail sectional view taken on the plane indicated by the line 5—5 of Fig. 1.

The member 1 comprises a stem 2 having at one end a gripping jaw 3 and an arm 4 which project in opposite directions and the said stem has at the opposite end a curved finger piece 5.

The member 6 comprises a stem 7 having a gripping jaw 8 at one end to coact with the jaw 3 and provided at the opposite end with a finger piece 9 which is curved reversely with respect to the finger piece 5. The opposing sides of the stems 2, and 7, are flattened to enable them to fit snugly together and be moved longitudinally with respect to each other and the stem 7 is provided at the inner end of the jaw 8 with a guide-way 10 to clear the stem 2. A blade 11 has its base portion secured to the enlarged head 16 of the stem 7 on opposite sides of the guide-way 10 by screws 12 and the blade bears on the outer side of the stem 2 and forms a portion of the guide therefor. The said blade 11 has its sharpened edge 13 which is slightly curved, as shown, presented to the corresponding curved edge 14 of the arm 4 and the cutting edge of the blade is adapted to move past said arm 4 and coact therewith to effect a shear cut. It will be understood that by operating the members 1, and 6, and by disposing the ear of an animal between the edges 13, 14, the ear may be readily cut to make an ear mark. The members 1, and 6, are held normally in open position by means of a spring 15 which is a coiled extensile spring that embraces the stems 2, and 7, and bears between the finger piece 5 of the member 1 and the enlarged head 16 of the member 6. It will be understood that the members are moved to closed position by the application of manual power against the tension of the spring 15.

The heads 17 of the jaws 3, and 8, which are preferably of the form here shown, are adapted to be forced against opposite sides of the cartilage between the animals nostrils so as to firmly grip the animal when the members 1, and 6, are in a position shown in dotted lines in Fig. 1. To hold the members in such closed position, I provide a keeper or loop 18 which is pivotally connected to the finger piece 5 and may be swung over one end of the finger piece 9 and engage with a notch 19 in the outer side of said finger piece 9. A chain, strap or the like may be attached to one end of the member 6 by means of an eye 20 with which such member is provided and employed to lead or hitch the animal gripped by the device.

Having thus described the invention, what I claim as new and desire to secure by Letters Patent is:—

1. A device of the class described comprising a pair of members each having a stem portion, said stem portions being slidably connected together for relatively longitudinal movement, said members having animal operating devices at one end and finger pieces at the other end and a spring to move said members to open position and disposed between the animal operating device of one member and the finger piece of the other member.

2. A device of the class described comprising a pair of members each having a stem portion, provided at one end with an animal operating device and at the opposite end with a finger piece, one of said members having a guide groove in one side for the reception of the stem of the other member and a cutting blade secured to the said member having the said guide groove, said cutting blade serving to retain the stem of the other member in said guide groove.

In testimony whereof I affix my signature in presence of two witnesses.

GEORGE DENO.

Witnesses:
GEORGE P. FIEDERLING,
GEORGE C. WOOD.